United States Patent [19]

Takebayashi

[11] Patent Number: 4,624,010

[45] Date of Patent: Nov. 18, 1986

[54] SPEECH RECOGNITION APPARATUS

[75] Inventor: Yoichi Takebayashi, Tokyo, Japan

[73] Assignee: Tokyo Shibaura Denki Kabushiki Kaisha, Kawasaki, Japan

[21] Appl. No.: 460,303

[22] Filed: Jan. 24, 1983

[30] Foreign Application Priority Data

Jan. 29, 1982 [JP] Japan .................................. 57-12808

[51] Int. Cl.[4] .............................................. G10L 5/00
[52] U.S. Cl. ........................................ 381/43; 381/41;
364/513.5
[58] Field of Search .................................. 381/36–50;
364/513, 513.5; 382/10, 16, 36–38

[56] References Cited

U.S. PATENT DOCUMENTS 3,553,372 1/1971 Wright .................................. 381/43
4,069,393 1/1978 Martin et al. ......................... 381/43

OTHER PUBLICATIONS

System, Computers, Controls, vol. 9, No. 3, May–Jun. 1978, Nakagawa et al., "A Real-Time Spoken Word Recognition System with Various Learning Capabilities of Speaker Differences".
Speech Analysis Synthesis and Perception, Second Edition, J. L. Flanagan, Jan. 1972, pp. 174–179, Springer-Verlag.
Electronics and Communications in Japan, vol. 46, No. 11, Nov. 1963, Sakai, "Electronics and Communications in Japan".
The Journal of the Acoustical Society of America, vol. 34, No. 1, Jan. 1962, P. N. Sholtz et al.: "Spoken Digit Recognition Using Vocal–Consonant Segmentation".
Proceedings of the National Electronics Conference, vol. 34, 1980, Jelinek, "Statistical Methods in Automatic Speech Recognition", Reddy, Knowledge Engineering in Speech Understanding Systems.

Primary Examiner—Eddie P. Chan
Assistant Examiner—John J. Salotto
Attorney, Agent, or Firm—Oblon, Fisher, Spivak, McClelland & Maier

[57] ABSTRACT

A speech recognition apparatus includes a speech signal analyzing circuit for time-sequentially generating acoustic parameter patterns representing the phonetic features of speech signals, and phoneme reference memories each storing a plurality of reference parameter pattern vectors. A phoneme pattern vector from the speech signal analyzing circuit is compared with each of the reference pattern vectors stored in the phoneme reference memories in order to recognize an input speech. The speech signal analyzing circuit has a parameter extraction circuit for time-sequentially extracting acoustic parameter patterns representing the speech signal, a first phoneme pattern vector memory for storing a phoneme pattern vector including an acoustic parameter pattern of each frame from the parameter extraction circuit, and a second phoneme pattern vector memory for storing a phoneme pattern vector including a plurality of parameter patterns from the parameter extraction circuit.

15 Claims, 9 Drawing Figures

SPEECH RECOGNITION APPARATUS

BACKGROUND OF THE INVENTION

This invention relates to a speech recognition apparatus which recognizes speech signals.

A speech recognition apparatus is known which can recognize several hundred words spoken by a specific person using word template matching with a high reliability. The apparatus compares feature parameter patterns of the input speech with reference parameter patterns previously registered. In a case where the apparatus using word template matching is applied to speaker independent speech recognition or to recognition of thousands of words, it is extremely difficult to change vocaburaries and collect a plentitude of data for constituting word reference patterns. Accordingly, it is desired that a speech recognition apparatus be provided which can recognize phonetic units, for example, phonemes to obtain phoneme sequences and take the symbolic pattern matching of each phoneme sequence thus obtained using a symbolically constructed lexicon, thus recognizing each spoken word. In a case where the phoneme is used as a phonetic unit for speech recognition, theoretically, the apparatus can recognize the speech of any person based on the recognized phoneme string which is obtained using 20 to 30 phonemes. It is therefore extremely important for the apparatus to effect speech analysis and phoneme recognition with a high accuracy.

There are two groups of phonemes, vowels and consonants. A vowel is relatively stable and its duration is long. Its feature hardly changes with time and may clearly appear in a frequency spectrum. By contrast, a consonant quickly changes, and its feature may clearly appear in a dynamic pattern of frequency spectrum. In the known apparatus, an input speech is analyzed for each frame and the acoustic parameter patterns such as frequency spectra for each frame are used as phoneme pattern vectors to recognize the input speech. It can therefore recognize vowels with a high accuracy, but cannot accurately recognize consonants.

Further, a method for recognizing both vowels and consonants is known. In this method, input speech is analyzed, thus providing frequency spectrum patterns for each frame, and the frequency spectrum patterns for two or more frames are used as phoneme pattern vectors. However, in this case, the number of orders of the phoneme pattern vector is increased, and a large number of calculations must be performed in order to recognize phonemes. The number of necessary calculations will be very large, particulary when statistical data processing is carried out to recognize phonemes. Thus, the above-mentioned method is not practicable.

SUMMARY OF THE INVENTION

It is an object of the present invention to provide a speech recognition apparatus which can accurately and efficiently recognize speech signals.

According to an aspect of the invention there is provided a speech recognition apparatus which comprises electric-acoustic transducer means for converting input speech to electrical signals; parameter extraction means for analyzing speech signals from the electric-acoustic transducer means and time-sequentially extracting acoustic parameter patterns representing the phonetic features of the speech signals; first memory means for storing phoneme pattern vector including the acoustic parameter pattern of one frame generated from the parameter extraction means; second memory means for storing phoneme pattern vector including the acoustic parameter patterns of a plurality of frames generated from the parameter extraction means; third memory means for storing a plurality of phoneme pattern vectors respectively including first phoneme reference patterns and representing a first group of phonemes; fourth memory means for storing phoneme pattern vectors each including second phoneme reference patterns and representing a second group of phonemes; calculating means for calculating the similarity between the phoneme pattern vector stored in the first memory means and each of the phoneme reference pattern vectors stored in the third memory means and the similarity between the phoneme pattern vector stored in the second memory means and each of the phoneme reference pattern vectors stored in the fourth memory means; and classification means for classifying the input speech according to output similarity from the calculating means.

In the present invention, vowels and consonants contained in input speech are recognized in different manner. More specifically, a vowel is recognized by matching, for example, a one-frame phoneme pattern representing phonetic features of the vowel of input speech with each of the first phoneme reference patterns which are stored in the third memory means. A consonant is recognized by matching two or more frames of phoneme patterns representing phonetic features of the consonant with each of the phoneme reference patterns stored in the fourth memory means. Both vowels and consonants contained in the input speech can thus be recognized with a high accuracy and a high efficiency.

DETAILED DESCRIPTION OF THE PREFERRED EMBODIMENTS

Figure 1:
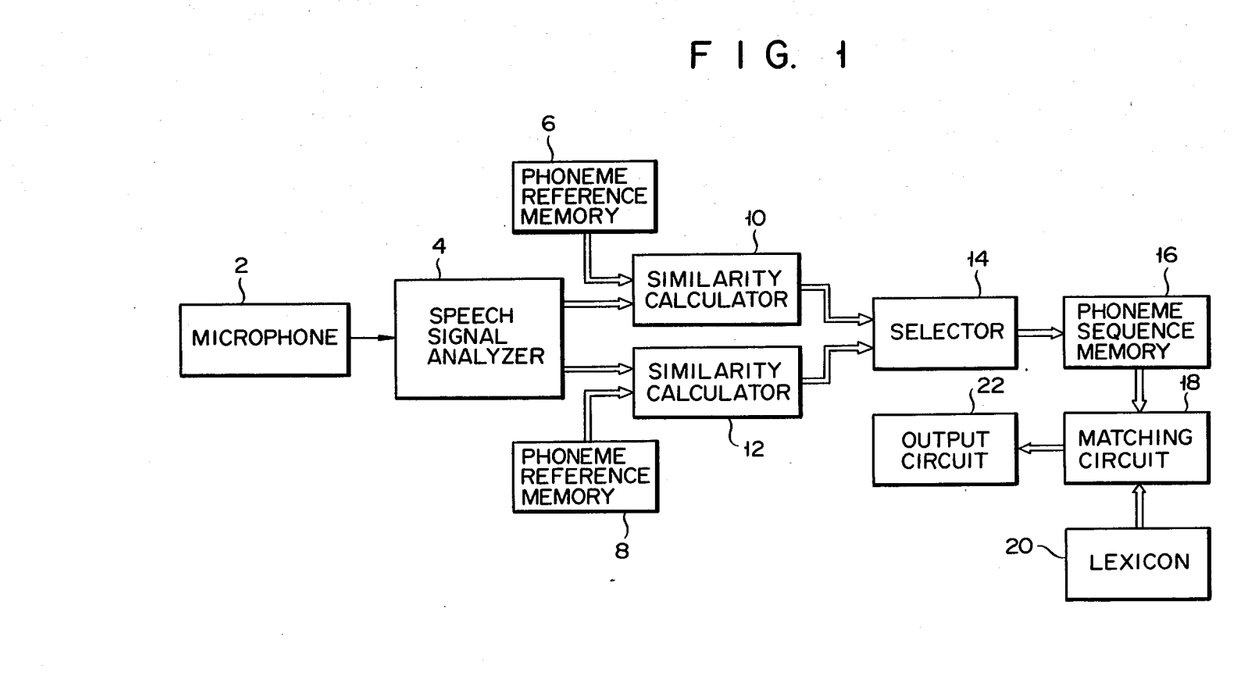
FIG. 1 is a block diagram of a speech recognition apparatus according to the present invention.

FIG. 1 is a block diagram of a speech recognition apparatus according to the present invention. The apparatus includes an electric-acoustic transducer such as a microphone 2, a speech signal analyzing circuit 4, two phoneme reference memories 6 and 8 and two similarity calculators 10 and 12. The microphone 2 converts an input speech to electrical speech signal. The speech signal analyzing circuit 4 analyzes the speech signal and generates acoustic parameter patterns representing the phonetic features of the vowels and consonants in the input speech. The phoneme reference memory 6 stores phoneme reference patterns representing the phonetical features of vowels. The phoneme reference memory 8 stores phoneme reference patterns representing the phonetic features of consonants. The similarity calculator 10 calculates the similarity between a vowel pattern vector from the speech signal analyzing circuit 4 and each of the reference pattern vectors of vowels stored in the phoneme reference memory 6, and then generates phoneme data corresponding to one of the phoneme reference pattern vectors which is most similar to the vowel pattern vector supplied from the speech signal analyzing circuit 4. The similarity calculator 12 calculates the similarity between a consonant pattern vector from the speech analyzing circuit 4 and each of the phoneme reference pattern vectors of consonants stored in the phoneme reference memory 8 and then generates phoneme data corresponding to one of the reference pattern vectors which is most similar to the consonant pattern vector supplied from the speech signal analyzing circuit 4. A similarity calculator disclosed in U.S. Pat. No. 3,688,267 may be used as the similarity calculators 10 and 12.

As shown in FIG. 1, the speech recognition apparatus further includes a selecting circuit 14, a phoneme sequence memory 16 and a matching circuit 18. The selecting circuit 14 selects a vowel data from the similarity calculator 10 or a consonant data from the similarity calculator 12, depending on the similarities of these phoneme data, thus producing a phoneme sequence. The phoneme sequence memory 16 stores the phoneme sequence supplied from the selecting circuit 14. The matching circuit 18 compares a recognized phoneme sequence stored in the phoneme sequence memory 16 with a plurality of phoneme sequences of words stored in a lexicon 20 to thereby detect a phoneme sequence of word corresponding to the recognized phoneme sequence and then supply the detected phoneme sequence of word to an output circuit 22 such as a display unit.

Figure 2:
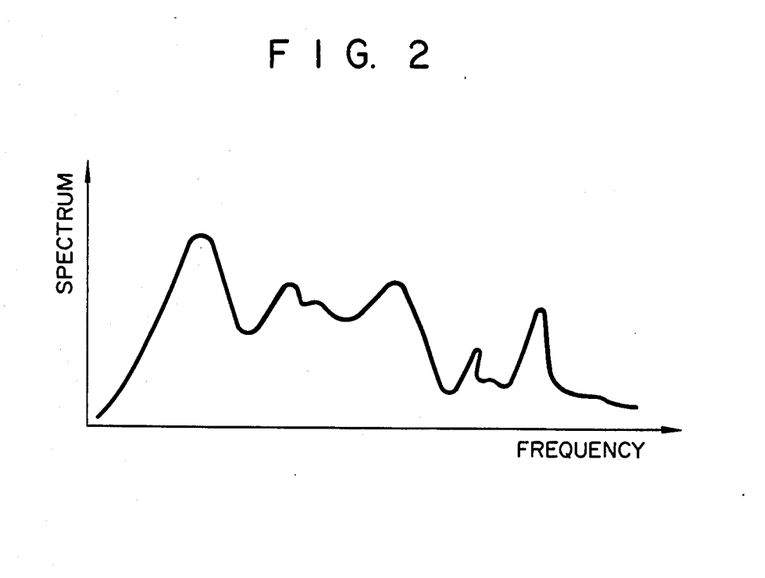
FIGS. 2 and 3 respectively show the frequency spectra of one-frame and plural frames for an input speech signal.
Figure 3:
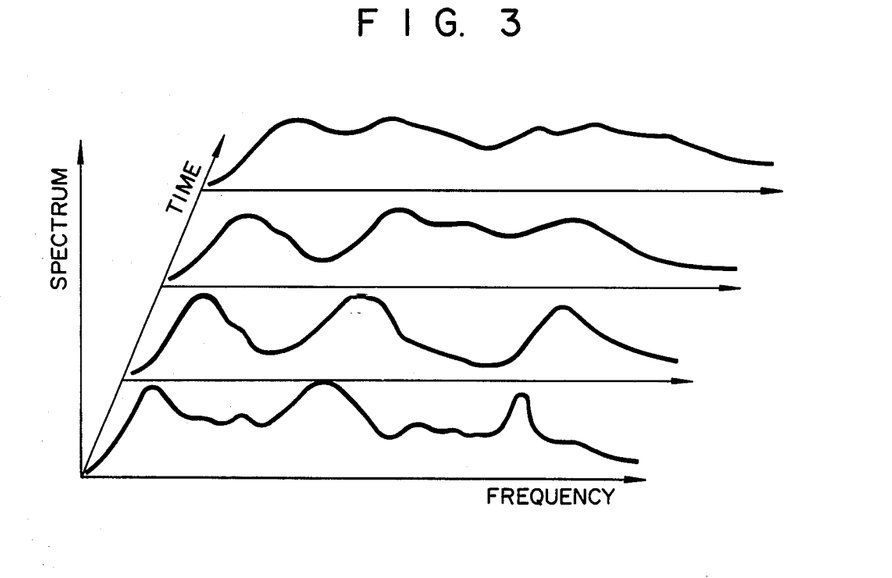

All the elements of the apparatus except the speech signal analyzing circuit 4 are well known. The circuit 4 analyzes input speech signals, employing the band filtering method, the discrete Fourier transform method, cepstrum analysis or linear prediction analysis, thereby extracting the acoustic parameters of the input speech signal. The circuit 4 is designed to generate a phoneme pattern vector such as frequency spectrum of one frame of a speech signal shown in FIG. 2 and a phoneme pattern vector such as frequency spectra of plural frames shown in FIG. 3.

Figure 4:
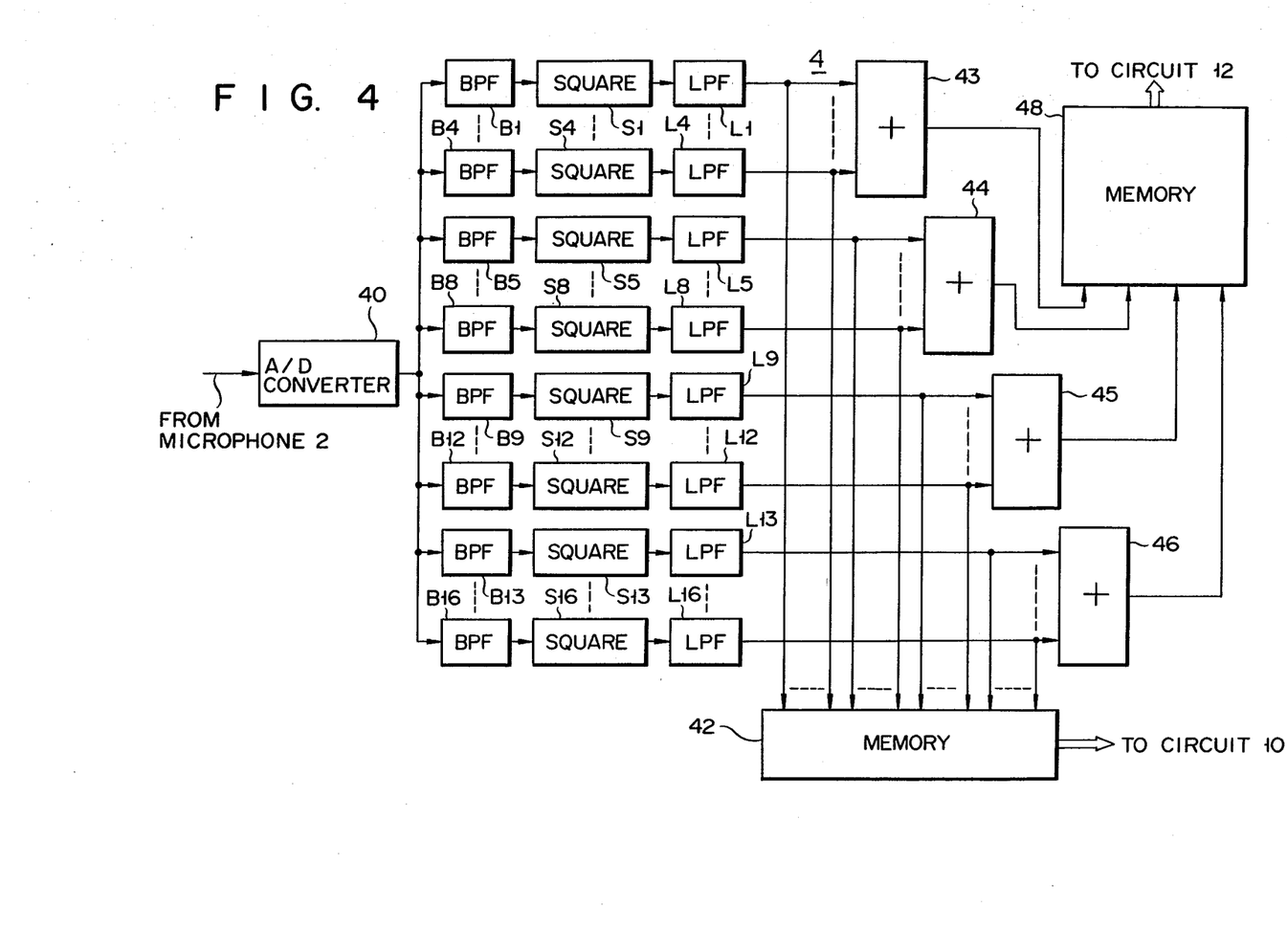
FIG. 4 is a block diagram of the speech signal analyzing circuit shown in FIG. 1.
Figure 5:
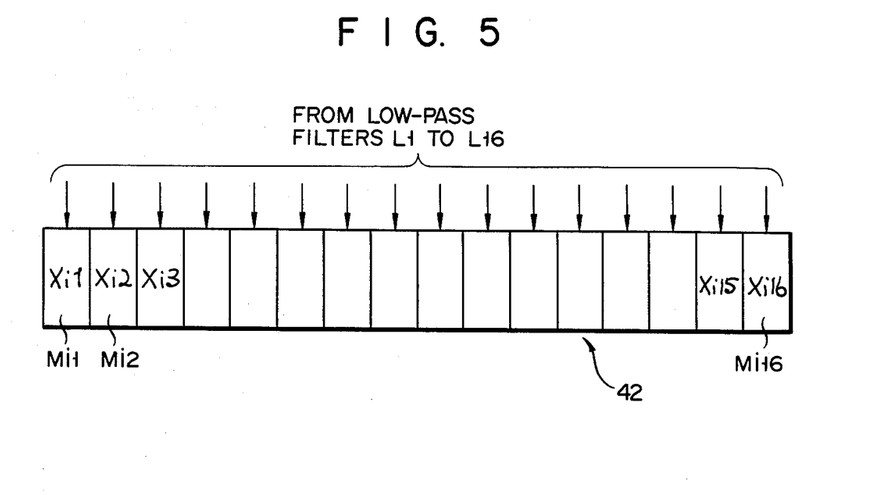
FIG. 5 shows a memory map of a phoneme pattern vector memory used in the speech signal analyzing circuit of FIG. 4.

As shown in FIG. 4, the speech signal analyzing circuit 4 includes an analog-digital converter 40, digital band-pass filters B1 to B16, square circuits S1 to S16 and low-pass filters L1 to L16. The analog-digital converter 40 converts an input speech signal from the microphone 2 to a digital signal every 0.1 millisecond, for example. The band-pass filters B1 to B16 are connected to receive the digital signal from the analog-digital converter 40. The filters B1 to B16 have different frequency bands which are determined by dividing the frequency band of the input speech signal by 16. The square circuits S1 to S16 are connected to the band-pass filters B1 to B16, respectively, for squaring the output signals from the band-pass filters B1 to B16. The low-pass filters L1 to L16 are connected to the square circuits S1 to S16, respectively, for smoothing the output signals from the square circuits S1 to S16. The output signals from the low-pass filters L1 to L16 are stored in a phoneme pattern vector memory 42 every 10 milliseconds, for example. As shown in FIG. 5, for example, the memory 42 is designed to have 16 memory areas Mi1 to Mi16 to store 16 acoustic parameter coefficients of one frame.

Figure 6:
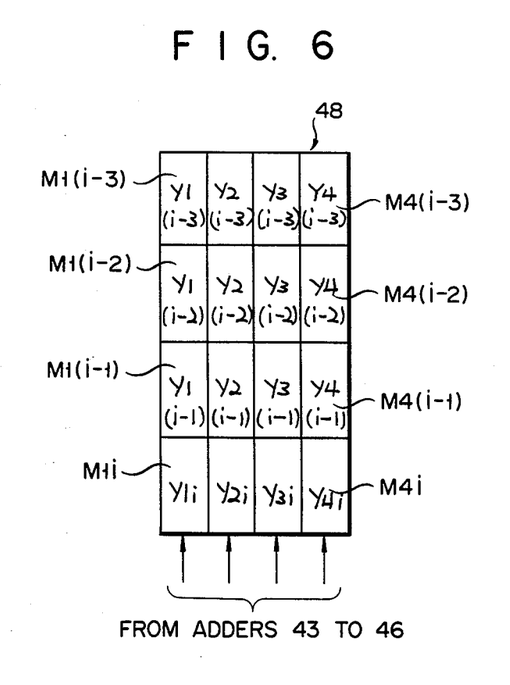
FIG. 6 shows a memory map of the other phoneme pattern vector memory used in the speech signal analyzing circuit of FIG. 4.

The output signals from the low-pass filters L1 to L4 are supplied to, and added by, an adder 43. The output signals from the low-pass filters L5 to L8 are supplied to, and added by, an adder 44. The output signals from the low-pass filters L9 to L12 are supplied to, and added by, an adder 45. The output signals from the low-pass filters L13 to L16 are supplied to, and added by, an adder 46. Hence, the adder 43 generates an output signal corresponding to speech signal components of frequency bands FB1 to FB4. Likewise, the adder 44 generates an output signal corresponding to speech signal components of frequency bands FB5 to FB8, the adder 45 generates an output signal corresponding to speech signal components of frequency bands FB9 to FB12, and the adder 46 generates an output signal corresponding to speech signal components of frequency bands FB13 to FB16. The output signals from these adders 43 to 46 are written into a phoneme pattern vector memory 48 every 10 milliseconds, for example. As shown in FIG. 6, for example, the memory 48 is designed to have 16 memory areas M1(i-3) to M4(i-3), M1(i-2) to M4(i-2), M1(i-1) to M4(i-1), and M1i to M4i in order to store four frames of accoustic parameter patterns each including four acoustic parameter coefficients.

Thus, the memory 42 stores phoneme pattern vector including 16 acoustic parameter coefficients Xi1 to Xi16 which correspond to 16 speech signal components of a given frame Fi having frequency bands FB1 to FB16. On the other hand, the memory 48 stores phoneme pattern vector including the parameter patterns of consecutive four frames F(i-3), F(i-2), F(i-1) and Fi which each include four acoustic parameter coefficients Y1 to Y4. Data Y1 corresponds to speech signal components of frequency bands FB1 to FB4, data Y2 to speech signal components of frequency bands FB5 to FB8, data Y3 to speech signal components of frequency bands FB9 to FB12, and data Y4 to speech signal components of frequency bands FB13 to FB16. In other words, the phoneme pattern vector stored in the memory 48 includes 16 acoustic parameter coefficients Y1(i-3) to Y4(i-3), Y1(i-2) to Y4(i-2), Y1(i-1);to Y4(i-1), and Y1i to Y4i.

The phoneme pattern vector stored in the memory 42 is renewed every 10 milliseconds. The phoneme pattern vector stored in the memory 48 is renewed in such a manner that one frame of four acoustic parameter coefficients which were first written into the memory 48 are renewed every 10 milliseconds. That is, the memory 42 stores phoneme pattern vector of 16 acoustic parameter coefficients which correspond to speech signal components of relatively narrow frequency bands and which are thus fit to represent vowels. By contrast, the memory 48 stores phoneme pattern vector of 16 acoustic parameter coefficients which correspond to four frames of speech signal components of relatively broad frequency bands, which contain time information and which are thus fit to represent consonants and semivowels. The similarity calculator 10 compares the phoneme pattern vector stored in the memory 42 with the reference vowel patterns stored in the memory 6. The similarity calculator 12 compares the phoneme pattern vector stored in the memory 48 with the reference consonant and semivowel patterns stored in the memory 8. Every 10 milliseconds the similarity calculator 10 generates a vowel data corresponding to the reference vowel pattern vector most similar to the data stored in the memory 6. The similarity calculator 12 generates a consonant or semivowel data corresponding to the reference consonant or semivowel pattern vector most similar to the data stored in the memory 8 every 10 milliseconds.

Both the vowel and consonant data are then supplied to the selecting circuit 14. The selecting circuit 14 selects one of the input data based on the similarity of the vowel data and the similarity of the consonant data. The data selected by the selecting circuit 14 is supplied to the phoneme sequence memory 16. As other succeeding data are time-sequentially supplied from the selecting circuit 14 to the phoneme sequence memory 16, the memory 16 will store phoneme sequence data. The phoneme sequence data is compared with a plurality of word data stored in the lexicon 20 by means of the matching circuit 18. The matching circuit 18 detects the word data corresponding to the input phoneme sequence data and supplies the word data thus detected to the output circuit 22.

In the embodiment described above, the phoneme pattern vector memory 42 stores 16 acoustic parameter coefficients $Xi1$ to $Xi16$ representing a one-frame acoustic parameter pattern, and the phoneme pattern vector memory 48 stores 16 acoustic parameter coefficients representing four frames of acoustic parameter coefficients $Y1(i-3)$ to $Y4(i-3)$, $Y1(i-2)$ to $Y4(i-2)$, $Y1(i-1)$ to $Y4(i-1)$ and $Y1i$ to $Y4i$. That is, the same number of acoustic parameter coefficients are used to recognize a vowel and a consonant. The amount of data processed to recognize phonemes of either type will not be increased. Since a phoneme pattern vector for recognizing a consonant or semivowel is constituted by plural frames of acoustic coefficients and includes time information, both a consonant and a semivowel can be recognized with a high accuracy.

Figure 7:
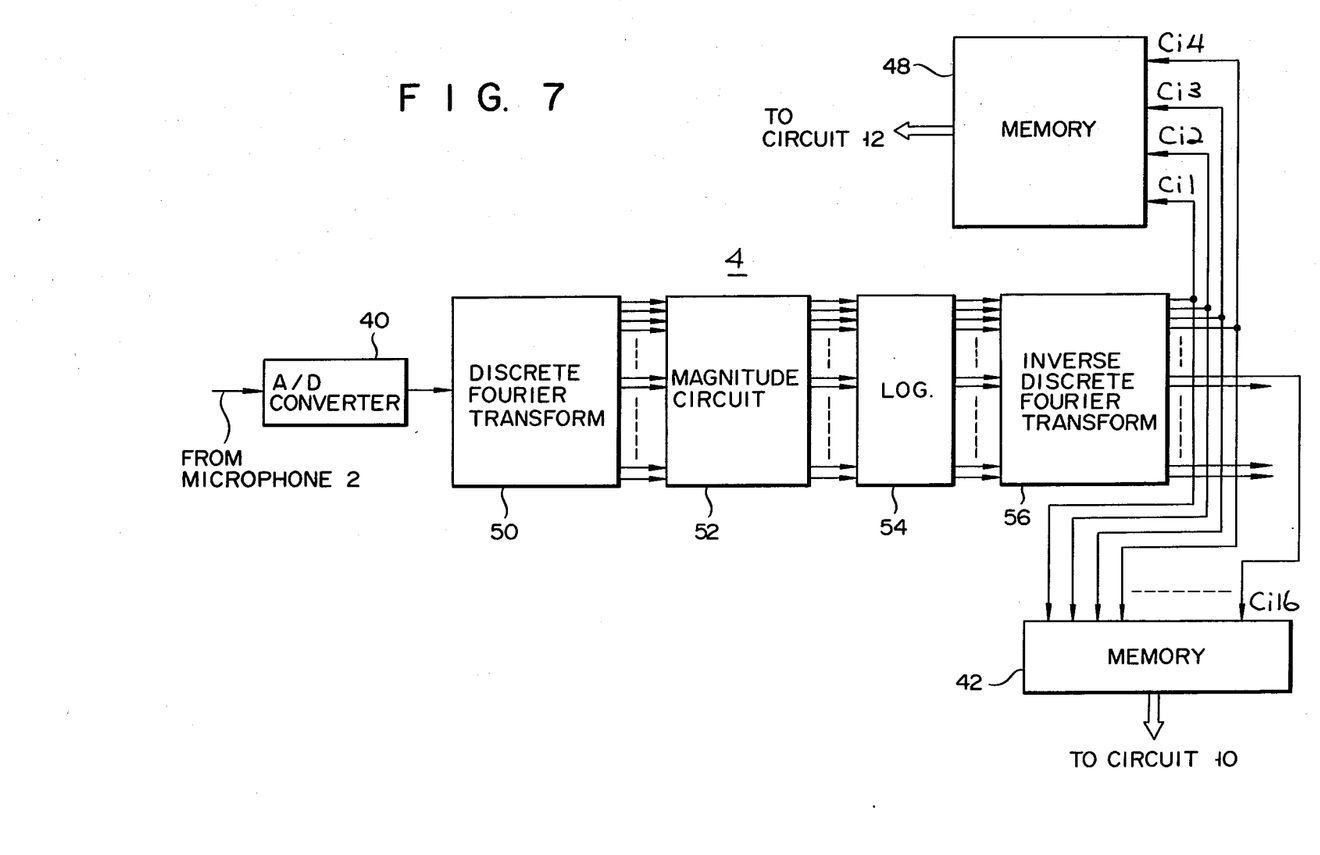
FIG. 7 is a block diagram of another speech signal analyzing circuit, which may be used in the apparatus of FIG. 1.

FIG. 7 is a modification of the speech signal analyzing circuit 4. This circuit 4 includes an analog-digital converter 40, a discrete Fourier transform circuit 50, a magnitude circuit 52, a logarithm circuit 54 and an inverse discrete Fourier transform circuit 56. The discrete Fourier transform circuit 50 performs discrete Fourier transform on the output signal from the analog-digital converter 40 and generates, for example, 256 output signals. The magnitude circuit 52 receives the 256 output signals from the circuit 50 and generates 256 output signals representing the absolute values of the input signals. The logarithm circuit 54 receives the output signals from the magnitude circuit 52 and generates output signals representing the logarithm values of the input signals. The inverse discrete Fourier transform circuit 56 performs inverse discrete Fourier transform on the output signals from the logarithm circuit 54 and generates data representing the cepstrum coefficients of the input speech signals. Of the 256 output terminals of the circuit 56, the 16 least significant or lower order terminals are connected to the memory 42, and the remaining 240 output terminals are not used. Of these 16 terminals, the four least significant or lower order terminals are connected to the memory 48. A one-frame cepstrum coefficient data representing first to sixteenth order cepstrum coefficients $Ci1$ to $Ci16$ is stored in the memory 42. The contents of the memory 42 are renewed every 10 milliseconds. Four frames of cepstrum coefficient data each including first to fourth order cepstrum coefficients are stored in the memory 48. More precisely, the memory 48 stores data representing cepstrum coefficients $C1(i-3)$ to $C4(i-3)$, $C1(i-2)$ to $C4(i-2)$, $C1(i-1)$ to $C4(i-1)$ and $C1i$ to $C4i$.

Analysis of cepstrum is achieved using the algorithm of fast Fourier transform. Therefore, it can effectively detect the envelope characteristic of the frequency spectrum of each speech signal. The first to sixteenth order cepstrum coefficients stored in the memory 42 represent the envelope characteristic of the frequency spectrum of the speech signal which has been minutely analyzed. Using the first sixteenth order cepstrum coefficients $Ci1$ to $Ci16$, a vowel can be efficiently recognized. The lower the order it has, the more roughly each cepstrum coefficient data from the inverse discrete Fourier transform circuit 56 represents the frequency spectrum of a speech signal. Hence, parameters accurately representing the dynamic features of speech signals can be obtained by extracting a plurality of one-frame cepstrum coefficient data each representing first to fourth order cepstrum coefficients.

Figure 8:
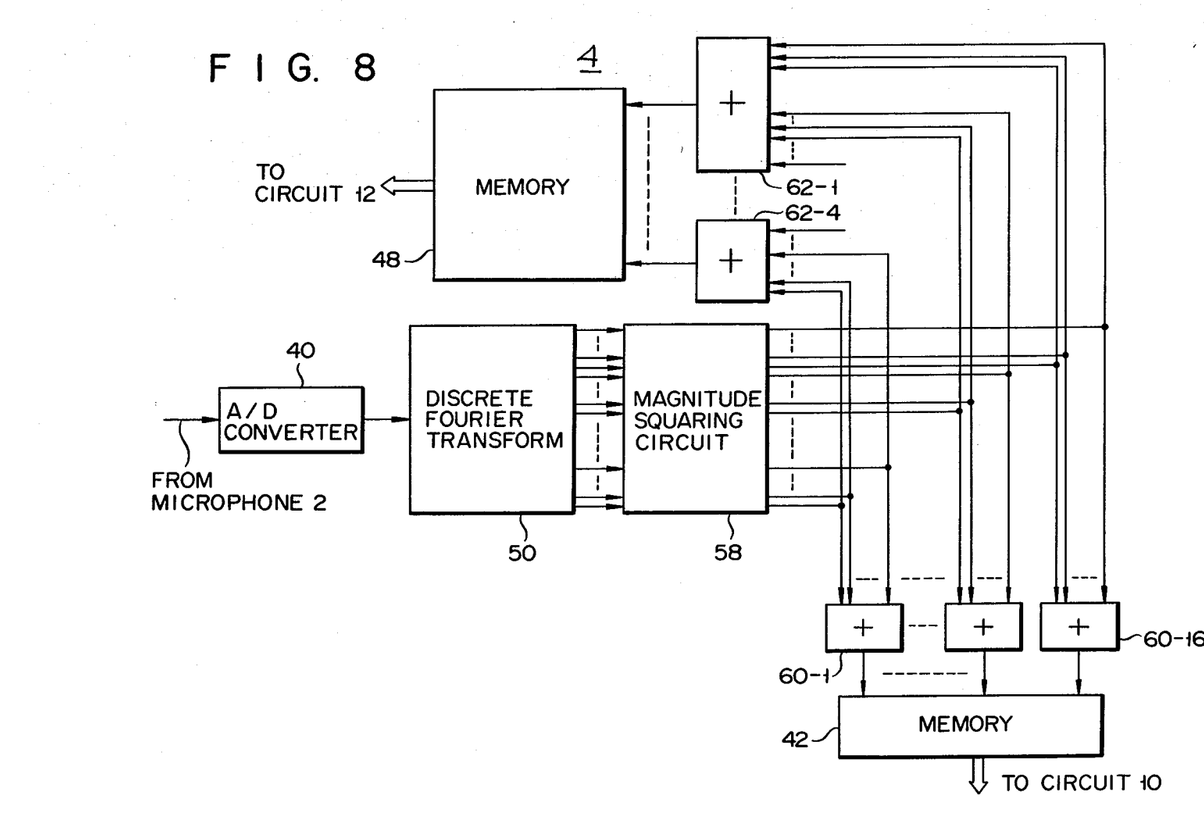
FIG. 8 is a block diagram of still another speech signal analyzing circuit which may be used in the apparatus of FIG. 1.

FIG. 8 is another modification of the speech signal analyzing circuit 4. This circuit 4 includes an analog-digital converter 40, a discrete Fourier transform circuit 50 and a magnitude squaring circuit 58. The discrete Fourier transform circuit 50 performs Fourier transform on the output signal from the analog-digital converter 40 and generates 256 output signals. The magnitude squaring circuit 58 magnitude-squares the output signal from the circuit 50. The circuit 58 has 256 output terminals.

The output terminals of the circuit 58 are divided into 16 groups. The output terminals of the first to sixteenth groups are connected to adders 60-1 to 60-16, respectively. Hence, the signals from the output terminals of each of the 16 groups are added by the corresponding adder to which the terminals are connected. The 256 output terminals of the magnitude squaring circuit 58 are also divided into four groups. The output terminals of the first to fourth groups are connected to adders 62-1 to 62-4, respectively. Hence, the signals from the output terminals of each of the four groups are added by the corresponding adder to which the terminals are connected.

Output signals from the adders 60-1 to 60-16 are supplied to a memory 42, and the output signals from the adders 62-1 to 62-4 are supplied to a memory 48. A phoneme pattern vector defined by 16 acoustic parameter coefficients and representing a one-frame frequency spectrum is stored in the memory 42. The contents of the memory 42 are renewed every 10 milliseconds. Four frames of acoustic parameter patterns each including four acoustic parameter coefficients are stored in the memory 48. The contents of the memory 48 are renewed every 10 milliseconds, acoustic parameter coefficients of one frame among the contents of the memory 48 are renewed every 10 milliseconds in the same manner as described before. The data stored in both memories 42 and 48 are processed in the same way as in the embodiment of FIGS. 1 to 4.

Figure 9:
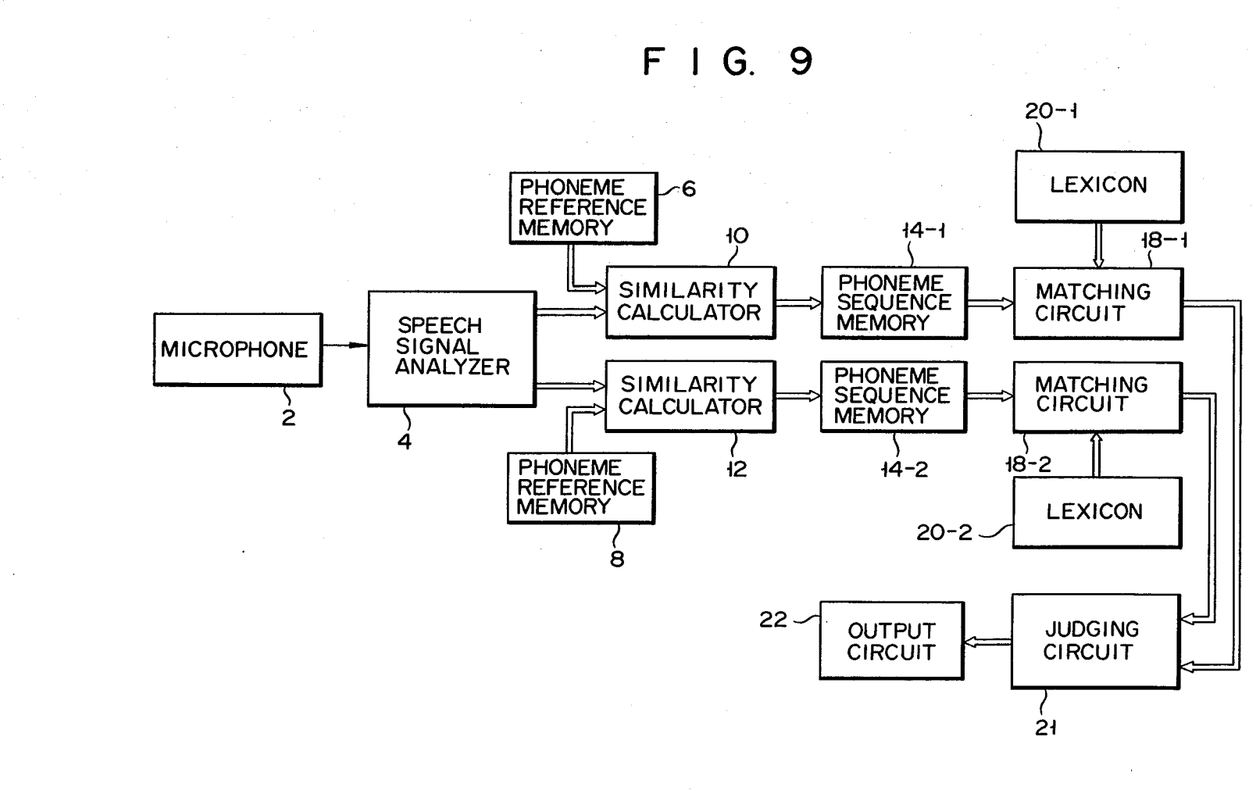
FIG. 9 is a block diagram of another speech recognition apparatus according to the present invention.

FIG. 9 is a block diagram of a speech recognition apparatus according to another embodiment of the present invention. The apparatus includes a microphone 2, a speech signal analyzing circuit 4, two phoneme reference memories 6 and 8, two similarity calculators 10 and 12 and an output circuit 22 which are all connected in the same manner as those shown in FIG. 1. Vowel data from the similarity calculator 10 is stored in a phoneme sequence memory 14-1 one after another. Consonant data from the similarity calculator 12 is stored in a phoneme sequence memory 14-2. Phoneme sequence data stored in the memory 14-1 is supplied to a matching circuit 18-1. The matching circuit 18-1 checks the matching degree between the phoneme sequence data and each of vowel sequence data stored in a lexicon 20-1. Phoneme sequence data stored in the memory 14-2 is supplied to a matching circuit 18-2. The matching circuit 18-2 checks the matching degree between the phoneme sequence data and each of consonant sequence data stored in a lexicon 20-2. Both matching circuits 18-1 and 18-2 generate output data which represent the results of the matching. These output data are supplied to a judging circuit 21, which recognizes the input speech signal.

The speech signal recognition apparatus illustrated in FIG. 9 can use any one of the speech signal analyzing circuits 4 shown in FIGS. 4, 7 and 8, too.

The present invention is not limited to the embodiments described above. In the embodiments described above, a phoneme pattern vector for recognizing a vowel and a phoneme pattern vector for recognizing a consonant include the same number of acoustic parameter coefficients. They may, however, be consituted by different numbers of acoustic parameter coefficients. For example, a consonant pattern vector may be constituted by 64 acoustic parameter coefficients (=4 frames×16 acoustic parameter coefficients). Further, in the speech signal analyzing circuit shown in FIG. 4 the adders 43 to 46 may be omitted and the output signals from the low-pass filters L1 to L16 may be supplied directly to the memory 48. Further, in the speech signal analyzing circuit shown in FIG. 8 the adders 62-1 to 62-4 may be omitted and the output signals from the adders 60-1 to 60-16 may be supplied directly to the memory 48. In these cases, the memory 48 is designed to have 64 memory areas. Still further, a vowel pattern vector of two-frame acoustic parameter patterns can be used. The number of acoustic parameter coefficients which form vowel or consonant pattern coefficients may be changed as much as the operation speed and ability of the similarity calculators 10 and 12 permit.

What is claimed is:

1. A speech recognition apparatus comprising:

electrical signal generating means for generating plural frames of electrical speech signals representing an input speech;

parameter extraction means for analyzing the speech signals from said electrical signal generating means and time-sequentially extracting acoustic parameter patterns representing the phonetic features of the speech signal for each frame and each including a plurality of acoustic parameter components, said parameter extraction means including a first output port from which M (M=an integer) acoustic parameter components derived from said plurality of extracted acoustic parameter components are generated and a second output port from whihc N (N=an integer smaller than M) acoustic parameter components derived from said plurality of extracted acoustic parameter components are supplied;

first phoneme pattern vector memory means for storing an acoustic parameter pattern formed of each frame of M acoustic parameter components supplied from said first output port of said parameter extraction means;

second phoneme pattern vector memory means for storing acoustic parameter patterns formed of plural frames of the N acoustic parameter components supplied from said second output port of said parameter extraction means;

first phoneme reference memory means storing a plurality of first reference pattern vectors, each including an acoustic parameter pattern and representing a first group of phonemes;

second phoneme reference memory means storing a plurality of second reference pattern vectors, each including a plurality of acoustic parameter patterns and representing a second group of phonemes;

calculating means for calculating the similarity between the pattern stored in said first phoneme pattern vector memory means and each of the first reference pattern vectors stored in said first phoneme reference memory means to produce phoneme data corresponding to one of the first reference phoneme vectors which has the largest similarity with respect to the pattern stored in said first phoneme pattern vector memory means and for calculating similarity between the patterns stored in said second phoneme pattern vector memory means and each of the second reference pattern vectors stored in said second phoneme reference memory means to produce phoneme data corresponding to one of the second reference phoneme vectors which has the largest similarity with respect to the patterns stored in said second phoneme vector memory means; and judging means for recognizing the input speech based on the phoneme data supplied from the calculating means.

2. A speech recognition apparatus according to claim 1, wherein said calculating means comprises a first similarity calculating circuit for calculating the similarity between the pattern stored in said first phoneme pattern vector memory means and the first reference pattern vectors stored in said first phoneme reference memory means and generating phoneme data representing the phonome of the first group of phonemes which is most similar to the pattern stored in said first phoneme pattern vector memory means and a second similarity calculating circuit for calculating the similarity between the patterns stored in said second phoneme pattern vector memory means and the second reference pattern vectors stored in said second phoneme reference memory means and generating phoneme data representing the phoneme of the second group of phonemes which is most similar to the patterns stored in said second phoneme pattern vector memory means, 3. A speech recognition apparatus according to claim 2, wherein said judging means comprises a selecting circuit for receiving phoneme data from said first and said second similarity calculating circuits and selecting one of the phoneme data from said first and second similarity calculating circuits in accordance with the values of similarities obtained in said first and second similarity calculating circuits, a sequence memory for storing phoneme data from said selecting circuit one after another, a sequence data memory storing a plurality of phoneme sequence data, and a matching circuit for checking the matching between the data stored in said sequence memory and the data stored in said sequence data memory to thereby generate the phoneme sequence data which is most similar to the data stored in said sequence memory.

4. A speech recognition apparatus according to claim 2, wherein said judging means comprises a first sequence memory for storing phoneme data from said first similarity calculating circuit, a second sequence memory for storing phoneme data from said second similarity calculating circuit, a first sequence data memory storing a plurality of first phoneme sequence data, a second sequence data memory storing a plurality of second phoneme sequence data, a first matching circuit for checking the matching between the data stored in said first sequence memory and the data stored in said first sequence data memory and generating the first phoneme sequence data which is most similar to the data stored in said first sequence memory, a second matching circuit for checking the matching between the data stored in said second sequence memory with the data stored in said second sequence data memory and generating the second phoneme sequence data which is most similar to the data stored in said second sequence memory, and a judging circuit for recognizing the input speech signal according to the first and second phoneme sequence data from said first and second matching circuits.

5. A speech recognition apparatus according to claim 1, wherein said parameter extraction means comprises an analog-digital converting circuit for converting said input speech signals from said speech signal generating means to digital signals, a plurality of band-pass filter circuits connected to an output terminal of said analog-digital converting circuit and having different frequency bands, a plurality of square circuits connected to said band-pass filter circuits, respectively, a plurality of low-pass filter circuits having input terminals connected to the square circuits and output terminals connected to said first phoneme pattern vector memory means, and a plurality of adder circuits each having input terminals connected to a respective predetermined number of the low-pass filter circuits and output terminals connected to said second phoneme pattern vector memory means.

6. A speech recognition apparatus according to claim 1, wherein said parameter extraction means comprises an analog-digital converting circuit for converting said input speech signals from said speech signal generating means to digital signals, discrete Fourier transform circuit for receiving the digital signals from said analog-digital converting circuit and generating a plurality of output signals representing the discrete Fourier transform coefficients corresponding to said digital signals, a magnitude squaring circuit for generating a plurality of output signals representing the squares of respective output signals from said discrete Fourier transform circuit, a plurality of first adder circuits having input terminals connected to respective first predetermined groups of the output terminals of said magnitude squaring circuit and output terminals connected to said first phoneme pattern vector memory means, and a plurality of second adder circuits each having input terminals connected to respective second predetermined groups of the output terminals of said magnitude squaring circuit and output terminals connected to said second phoneme pattern vector memory means.

7. A speech recognition apparatus according to claim 1, wherein said parameter extraction means comprises an analog-digital converting circuit for converting said input speech signals from said speech signal generating means to digital signals, a discrete Fourier transform circuit for receiving the digital signals from said analog-digital converting circuit and generating a plurality of output signals representing the discrete Fourier transform coefficients corresponding to said digital signals, a magnitude circuit connected to said discrete Fourier transform circuit, a logarithm circuit connected to the magnitude circuit, and an inverse discrete Fourier transform circuit having input terminals connected to said logarithm circuit and output terminals connected to said first and second phoneme pattern vector memory means for supplying a plurality of low-order cepstrum coefficient data to said first phoneme pattern vector memory means for storage therein and supplying at least part of the low-order cepstrum coefficient data to said second phoneme pattern vector memory means for storage therein.

8. A speech signal analyzing circuit for a speech recognition apparatus, comprising:
parameter extraction means for time-sequentially extracting acoustic parameter patterns representing the phonetic features of respective frames of an input speech signal;
first phoneme pattern vector memory means for storing an acoustic parameter pattern of each frame from said parameter extraction means; and
second phoneme pattern vector memory means for storing acoustic parameter patterns of plural frames from said parameter extraction means;
wherein said parameter extraction means comprises an analog-digital converting circuit for converting an input speech signal from said speech signal generating means to a digital signal, a plurality of band-pass filter circuits connected to the output terminal of said analog-digital converting circuit and having different frequency bands, a plurality of square circuits connected to said band-pass filter circuits, respectively, a plurality of low-pass filter circuits having input terminals connected to the square circuits and output terminals connected to said first phoneme pattern vector memory means, and a plurality of adder circuits each having input terminals connected to a respective predetermined number of the low-pass filter circuits and output terminals connected to said second phoneme pattern vector memory means.

9. A speech signal analyzing circuit for a speech recognition apparatus, comprising:
parameter extraction means for time-sequentially extracting acoustic parameter patterns representing the phonetic features of respective frames of an input speech signal;
first phoneme pattern vector memory means for storing an acoustic parameter pattern of each frame from said parameter extraction means; and
second phoneme pattern vector memory means for storing acoustic parameter patterns of plural frames from said parameter extraction means;
wherein said parameter extraction means comprises an analog-digital converting circuit for converting an input speech signal from said speech signal generating means to a digital signal, a discrete Fourier transform circuit for receiving the digital signal from said analog-digital converting circuit and generating a plurality of output signals representing the discrete Fourier transform coefficients corresponding to said digital signal, a magnitude squaring circuit for generating a plurality of output signals representing the squares of respective output signals from said discrete Fourier transform circuit, a plurality of first adder circuits each having input terminals connected to respective first predetermined groups of the output terminals of said magnitude squaring circuit and output terminals connected to said first phoneme pattern vector memory means, and a plurality of second adder circuits each having input terminals connected to respective second predetermined groups of the output terminals of said magnitude squaring circuit and output terminals connected to said second phoneme pattern vector memory means.

10. A speech signal analyzing circuit for a speech recognition apparatus, comprising:
parameter extraction means for time-sequentially extracting acoustic parameter patterns representing the phonetic features of respective frames of an input speech signal;
first phoneme pattern vector memory means for storing an acoustic parameter pattern of each frame from said parameter extraction means; and
second phoneme pattern vector memory means for storing acoustic parameter patterns of plural frames from said parameter extraction means;
wherein said parameter extraction means comprises an analog-digital converting circuit for converting an input speech signal from said speech signal generating means to a digital signal, a discrete Fourier transform circuit for receiving the digital signal from said analog-digital converting circuit and generating a plurality of output signals representing the discrete Fourier transform coefficients corresponding to said digital signal, a magnitude circuit connected to said discrete Fourier transform circuit, a logarithm circuit connected to the magnitude circuit, and an inverse discrete Fourier transform circuit having input terminals connected to said logarithm circuit and output terminals connected to said first and said second phoneme pattern vector memory means for supplying a plurality of low-order cepstrum coefficient data to said first phoneme pattern vector memory means and supplying at least part of the low-order cepstrum coefficient data to said second phoneme pattern vector memory means.

11. A speech recognition apparatus comprising:
electrical signal generating means for generating plural frames of electrical speech signals representing an input speech;
parameter extraction means for analyzing the electrical speech signals from said electrical signal generating means and time-sequentially extracting vowel and consonant acoustic parameter patterns representing the phonetic features of the speech signals for each frame;
vowel phoneme pattern vector memory means for storing an acoustic parameter pattern formed of each frame supplied by said parameter extraction means;
consonant phoneme pattern vector memory means for storing acoustic parameter patterns of plural frames supplied by said parameter extraction means;
vowel reference memory means storing a plurality of vowel reference pattern vectors, each including an acoustic parameter pattern and representing a first group of phonemes;
consonant reference memory means storing a plurality of consonant reference pattern vectors each including a plurality of acoustic parameter patterns and representing a second group of phonemes;
calculating means for calculating the similarity between the pattern stored in said vowel phoneme pattern vector memory means and each of the vowel reference pattern vectors stored in said vowel phoneme reference memory means to produce vowel phoneme data corresponding to one of the vowel reference phoneme vectors which has the largest similarity with respect to the pattern stored in said vowel phoneme pattern vector memory means and for calculating similarity between the patterns stored in said consonant phoneme pattern vector memory means and each of the consonant reference pattern vectors stored in said consonant phoneme reference memory means to produce consonant phoneme data corresponding to one of the consonant reference phoneme vectors which has the largest similarity with respect to the patterns stored in said consonant phoneme vector memory means; and
judging means for recognizing the input speech based on said vowel and consonant phoneme data supplied from the calculating means.

12. A speech recognition apparatus according to claim 11, wherein said parameter extraction means comprises:
means for obtaining plural Fourier components of said electrical speech signal in respective predetermined frequency bands for each frame of said speech signals;
means for arithmetically combining predetermined groups of said plural Fourier components to produce plural consonant acoustic parameter pattern components based on predetermined arithmetic combinations of said plural Fourier components, said plural consonant acoustic parameter pattern components applied to said consonant phoneme pattern vector memory means and stored therein; and
said plural Fourier components applied to said vowel phoneme pattern vector memory means and stored therein.

13. A speech recognition apparatus according to claim 11, wherein said parameter extraction means comprises an analog-digital converting circuit for converting said input speech signals from said speech signal generating means to digital signals, a plurality of bandpass filter circuits connected to the output terminal of said analog-digital converting circuit and having different frequency bands, a plurality of square circuits connected to said band-pass filter circuits, respectively, a plurality of low-pass filter circuits having input terminals connected to the square circuits and output terminals connected to said first phoneme pattern vector memory means, and a plurality of adder circuits each having input terminals connected to a respective predetermined number of the low-pass filter circuits and output terminals connected to said consonant phoneme pattern vector memory means.

14. A speech recognition apparatus according to claim 11, wherein said parameter extraction means comprises an analog-digital converting circuit for converting said input speech signals from said speech signal generating means to digital signals, a discrete Fourier transform circuit for receiving the digital signal from said analog-digital converting circuit and generating a plurality of output signals representing the discrete Fourier transform coefficients corresponding to said digital signal, a magnitude squaring circuit for generating a plurality of output signals representing the squares of respective output signals from said discrete Fourier transform circuit, a plurality of first adder circuits each having input terminals connected to respective first predetermined groups of the output terminals of said magnitude squaring circuit and output terminals connected to said vowel phoneme pattern vector memory means, and a plurality of second adder circuits each having input terminals connected to respective second predetermined groups of the output terminals of said magnitude squaring circuit and output terminals connected to said consonant phoneme pattern vector memory means.

15. A speech recognition apparatus according to claim 11, wherein said parameter extraction means comprises an analog-digital converting circuit for converting said input speech signals from said speech signal generating means to digital signals, a discrete Fourier transform circuit for receiving the digital signals from siad analog-digital converting circuit and generating a plurality of output signals representing the discrete Fourier transform coefficients corresponding to said digital signals, a magnitude circuit connected to said discrete Fourier transform circuit, a logarithm circuit connected to the magnitude circuit, and an inverse discrete Fourier transform circuit having input terminals connected to said logarathm circuit and output terminals connected to said first and second phoneme pattern vector memory means for supplying a plurality of low-order cepstrum coefficient data to said vowel phoneme pattern vector memory means for storage therein and supplying at least part of the low-order cepstrum coefficient data to said consonant phoneme pattern vector memory means for storage therein.

* * * * *